US011269940B1

(12) United States Patent
Zhu et al.

(10) Patent No.: US 11,269,940 B1
(45) Date of Patent: Mar. 8, 2022

(54) RELATED CONTENT SEARCHING

(71) Applicant: Twitter, Inc., San Francisco, CA (US)

(72) Inventors: Xiao Zhu, San Francisco, CA (US); Joe Connors, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/120,099

(22) Filed: Aug. 31, 2018

(51) Int. Cl.
| | |
|---|---|
| *G06F 3/0482* | (2013.01) |
| *G06F 16/338* | (2019.01) |
| *H04L 51/52* | (2022.01) |
| *G06F 3/0485* | (2022.01) |
| *G06N 20/00* | (2019.01) |
| *G06F 16/33* | (2019.01) |
| *G06F 16/9535* | (2019.01) |

(52) U.S. Cl.
CPC .......... *G06F 16/338* (2019.01); *G06F 3/0482* (2013.01); *G06F 3/0485* (2013.01); *G06F 16/334* (2019.01); *G06F 16/9535* (2019.01); *G06N 20/00* (2019.01); *H04L 51/32* (2013.01)

(58) Field of Classification Search
None
See application file for complete search history.

(56) References Cited

U.S. PATENT DOCUMENTS 8,949,330 B2   2/2015  Chennamadhavuni

| 2005/0022226 | A1* | 1/2005 | Ackley | G06Q 30/0641 |
| | | | | 725/23 |
| 2007/0244975 | A1* | 10/2007 | Dillon | G06Q 10/107 |
| | | | | 709/206 |
| 2009/0024923 | A1* | 1/2009 | Hartwig | G06F 16/70 |
| | | | | 715/716 |

(Continued)

FOREIGN PATENT DOCUMENTS

WO    WO-2017048297 A1 *  3/2017  .............. G06Q 50/01

OTHER PUBLICATIONS

Guy et al., "Social Media Recommendation based on People and Tags," retrieved from the internet on Oct. 24, 2019 at URL <https://www.research.ibm.com/haifa/dept/imt/papers/guySIGIR10.pdf>, IBM Research Lab; Haifa 31905, Israel; 8 pages.

(Continued)

*Primary Examiner* — Phenuel S Salomon
(74) *Attorney, Agent, or Firm* — Fish & Richardson P.C.

(57) ABSTRACT

Methods, systems, and apparatus, including computer programs encoded on computer storage media, for providing related content on social networking platforms. One of the methods includes displaying multiple messages of a social networking platform, wherein each of the multiple messages of the social networking platform has an associated user-selectable user interface element; receiving, from a user, a first request for content related to a user-selected message, wherein the first request is submitted by selecting the associated user-selectable user interface element; in response to receiving the first request, processing the user's social network profile to obtain multiple user-related signals; processing the user-selected message to obtain multiple message-related signals; and obtaining, based on the multiple user-related and message-related signals, multiple terms and multiple relevant messages; and displaying, in a second client user interface, the multiple terms and the multiple relevant messages.

33 Claims, 5 Drawing Sheets

(56) References Cited

U.S. PATENT DOCUMENTS

| | | | |
|---|---|---|---|
| 2009/0281975 A1* | 11/2009 | Atallah | G06F 16/50 |
| | | | 706/18 |
| 2009/0319518 A1* | 12/2009 | Koudas | G06F 16/338 |
| 2010/0153831 A1* | 6/2010 | Beaton | G06Q 30/0603 |
| | | | 715/201 |
| 2010/0174743 A1* | 7/2010 | Komano | G06F 16/2428 |
| | | | 707/769 |
| 2012/0005224 A1* | 1/2012 | Ahrens | H04W 4/21 |
| | | | 707/769 |
| 2013/0097173 A1* | 4/2013 | Stovicek | G06F 3/04883 |
| | | | 707/741 |
| 2014/0129634 A1 | 5/2014 | Kim et al. | |
| 2014/0156681 A1* | 6/2014 | Lee | G06F 16/9535 |
| | | | 707/754 |
| 2015/0221345 A1* | 8/2015 | Zhao | H04N 21/85406 |
| | | | 386/241 |
| 2016/0063117 A1* | 3/2016 | Carter | G06F 16/248 |
| | | | 707/727 |
| 2016/0205431 A1* | 7/2016 | Avedissian | G06F 3/0481 |
| | | | 725/37 |
| 2017/0140011 A1* | 5/2017 | Kuefer | G06F 16/907 |
| 2018/0121549 A1 | 5/2018 | Ramesh et al. | |

OTHER PUBLICATIONS

Prando et al., "Content-based Recommender System using Social Networks for Cold-start Users," retrieved from the internet on Oct. 24, 2019 at URL <https://pdfs.semanticscholar.org/3e40/11e490998eb9eff5d3f1492318eabe9492b3.pdf>, 9 pages.

Seth et al., "A Social Network Based Approach to Personalized Recommendation of Participatory Media Content," retrieved from the internet on Oct. 24, 2019 at URL <https://www.aaai.org/Papers/ICWSM/2008/ICWSM08-021.pdf>, 9 pages.

* cited by examiner

RELATED CONTENT SEARCHING

BACKGROUND

This specification relates to providing content on social networking platforms. Social networking platforms allow users to maintain social networking profiles and build connections with other users. Social networking platforms include common features that allow users to post messages, view messages, or comment on messages.

SUMMARY

This specification describes systems and methods for providing content that may be of interest to a user on a social networking platform. Specifically, in response to a user selection of a user interface element associated with a presented message, the system determines one or more terms and one or more relevant messages associated with the presented message. In some implementations, the system determines the one or more terms and the one or more relevant messages by obtaining and analyzing one or more signals on the social networking platform. The system provides data for presenting a user interface that includes the one or more terms as well as the one or more relevant messages. In response to a user selection of one of the one or more terms, the system provides related content to the user, for example, one or more messages of the social networking platform related to the selected term.

In general, one innovative aspect of the subject matter described in this specification can be embodied in methods that include the actions of displaying, in a first client user interface, multiple messages of a social networking platform, wherein each of the multiple messages of the social networking platform has an associated user-selectable user interface element; receiving, from a user, a first request for content related to a user-selected message of the multiple messages, wherein the first request is submitted by selecting the associated user-selectable user interface element; in response to receiving the first request, processing a social network profile of the user to obtain multiple user-related signals, wherein each of the multiple user-related signals comprises one or more features of the user's social network profile on the social networking platform; processing the user-selected message to obtain multiple message-related signals, wherein each of the multiple message-related signals comprises one or more features of the user-selected message in the social networking platform; and obtaining, based on the multiple user-related and message-related signals, multiple terms and multiple relevant messages, wherein each of the multiple terms comprises searchable keywords, and wherein each relevant message comprises content on the social networking platform related to the user-selected message; and displaying, in a second client user interface, the multiple terms and the multiple relevant messages.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method includes displaying the multiple relevant messages includes ordering the multiple relevant messages in the second client user interface based on relevance score, wherein relevance score indicates the degree of relevance between the relevant message and the user-selected message, and wherein relevant messages with higher relevance score are placed on top. The method further includes receiving, from the user, a second request for content related to a user-selected relevant message displayed in the second client user interface, wherein the relevant message has an associated user-selectable user interface element, and wherein the second request is submitted by selecting the associated user-selectable user interface element; and displaying multiple terms and multiple relevant messages in a third client user interface, wherein the multiple terms and multiple relevant messages are obtained in response to the second request. The user can navigate among the first, second, and third client user interface.

The method further includes receiving, from the user, a selection of one of the selectable terms displayed in the second client user interface; in response to receiving the selection, performing a search on the social networking platform for relevant messages, wherein the search is performed using the term as keyword; and displaying, to the user in a fourth user interface, multiple relevant messages returned in response to the search using the term as keyword. Relevant messages displayed in the fourth client user interface are a subset of relevant messages displayed in the third client user interface, and wherein relevant messages displayed in the third client user interface are a subset of relevant messages displayed in the second user interface. The method further includes storing the user-related signals, the message-related signals, and the user-selected terms as training data for training a machine learning model, wherein the model is trained to generate terms based on the selected message.

Particular embodiments of the subject matter described in this specification can be implemented so as to realize one or more of the following advantages. A user browsing content on a social networking platform can quickly and efficiently search for related information and be directed to a new page displaying such information. In particular, a user can be provided with related content of the social networking platform in response to successive searches performed without returning to a general search interface. The social networking platform thus provides reduced human-system interaction latency that can result in greater user engagement. The social networking platform further benefits from the ability to serve advertisements based on a feed of contextually related content.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like elements in the various figures are denoted by like reference numerals for consistency.

DETAILED DESCRIPTION

Figure 1:
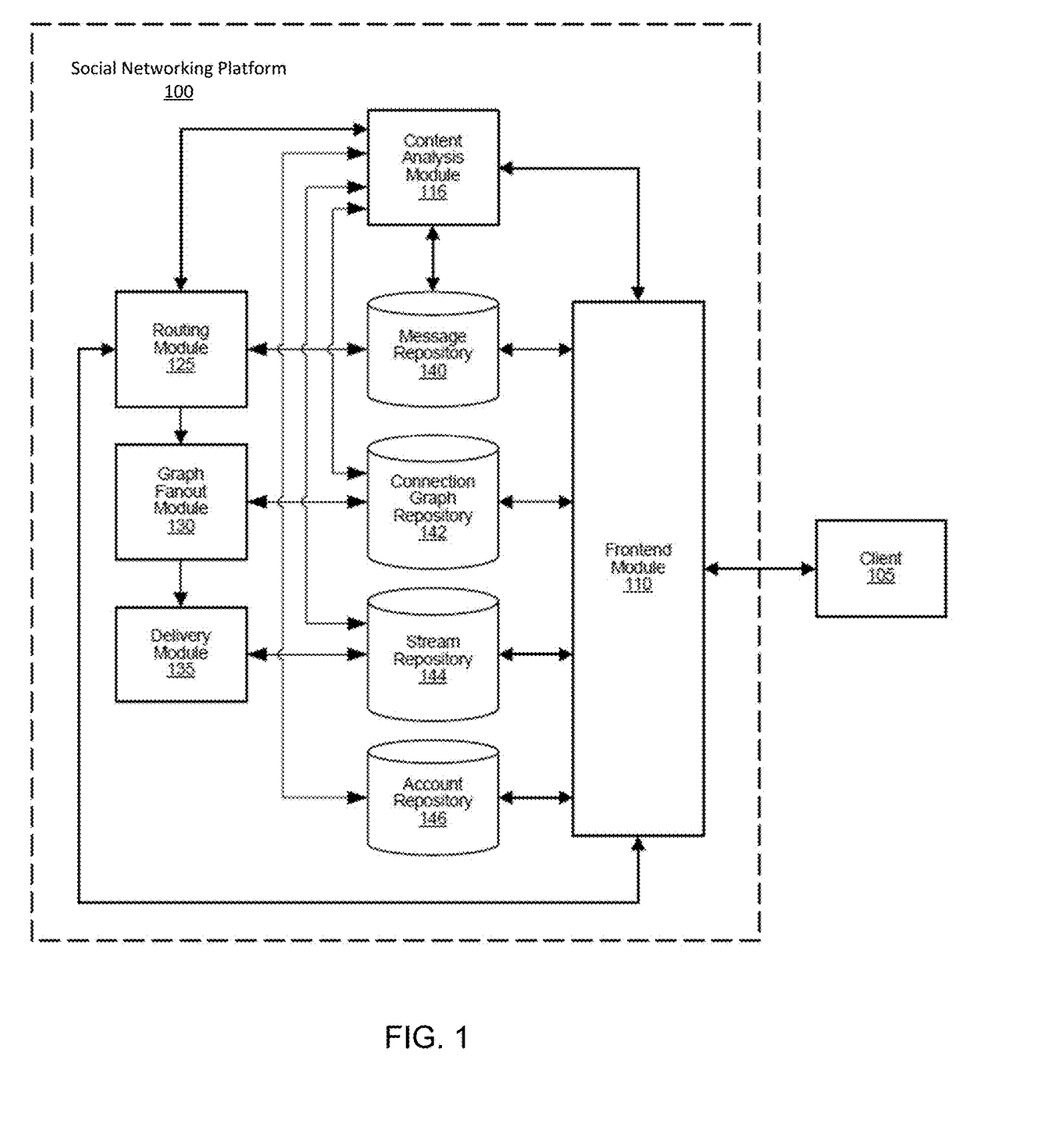
FIG. 1 is a block diagram of an example architecture for a social networking platform.

FIG. 1 is a block diagram of an example architecture for a social networking platform 100. The platform has multiple components including a frontend module 110, a content delivery module 116, a routing module 125, a graph fanout module 130, a delivery module 135, a message repository 140, a connection graph repository 142, a stream repository 144, and an account repository 146. Various components of the social networking platform 100 can be installed and executing on a computer, e.g., a server, mainframe, or personal computer, or on multiple separate computers, in one or more locations, coupled to communicate with each other over a data communication network, e.g., a local area network (LAN), a wide area network, the Internet, or two or more of them. In particular deployments, more than one of each component can be running on a particular computer, and each component can be deployed to run on multiple computers.

The platform facilitates real-time communication between one or more entities. The platform may store millions of accounts of individuals, businesses, or other entities, as well as pseudonym accounts, novelty accounts, and so on. One or more users of each account may use the platform to send messages to, and receive messages from, other accounts. The platform may be configured to enable users to communicate in "real-time," e.g., to exchange messages with other users with a minimal delay and to conduct a message-based conversation with one or more other users during simultaneous sessions. Thus, the platform may allow a user to broadcast messages and may display the messages to one or more other users within a time frame short enough to allow a live interactions between the users.

The platform connects users to other users of the platform, exchanges social networking messages between users of the platform, and provides interfaces for users to create, view, and search for messages. Messages on the platform may include, for example, original content published by a user, replies to messages, personal status updates, multimedia content files, images or videos, or any other information.

The platform is configured to transmit streams of messages to accounts based on a connection graph representing relationships between accounts. A stream of messages, which may be referred to simply as a "stream," is a dynamic list of messages on the platform that meet one or more stream criteria. The messages of a stream may be ordered chronologically by time and date of authorship, or reverse chronologically. Streams may also be ordered in other ways, e.g., according to a computationally predicted relevance to the receiving account holder, or according to some combination of time and relevance score.

The routing module is configured to receive messages and to store the messages in the message repository. For example, the routing module can assign an identifier to the message and provide identification of a sender of the message to the graph fanout module.

The content analysis module is configured to identify terms associated with a message on the platform. For example, the content analysis module can identify words or phrases that are relevant to and representative of the message's major topics. The content analysis module can store the identified terms as metadata associated with the message in the message repository.

In some implementations, the content analysis module identifies the terms using natural language processing techniques, e.g., keyword extraction. For example, the content analysis module can identify a set of candidate terms from each message, and score and rank each candidate term to identify a set of terms.

In some implementations, the content analysis module can use one or more signals on the platform to identify terms when insufficient information exists to identify candidate terms in the message. For example, the message may include a word that is not a predefined term in the message repository. The content analysis module can analyze other messages, accounts, or connection graphs on the platform to obtain related signals. For example, the content analysis module can obtain information from the identifiers assigned to each message by the routing module. In addition, the routing module can attach additional signals based on information in the message repository, the connection graph repository, or the account repository.

Figure 2:
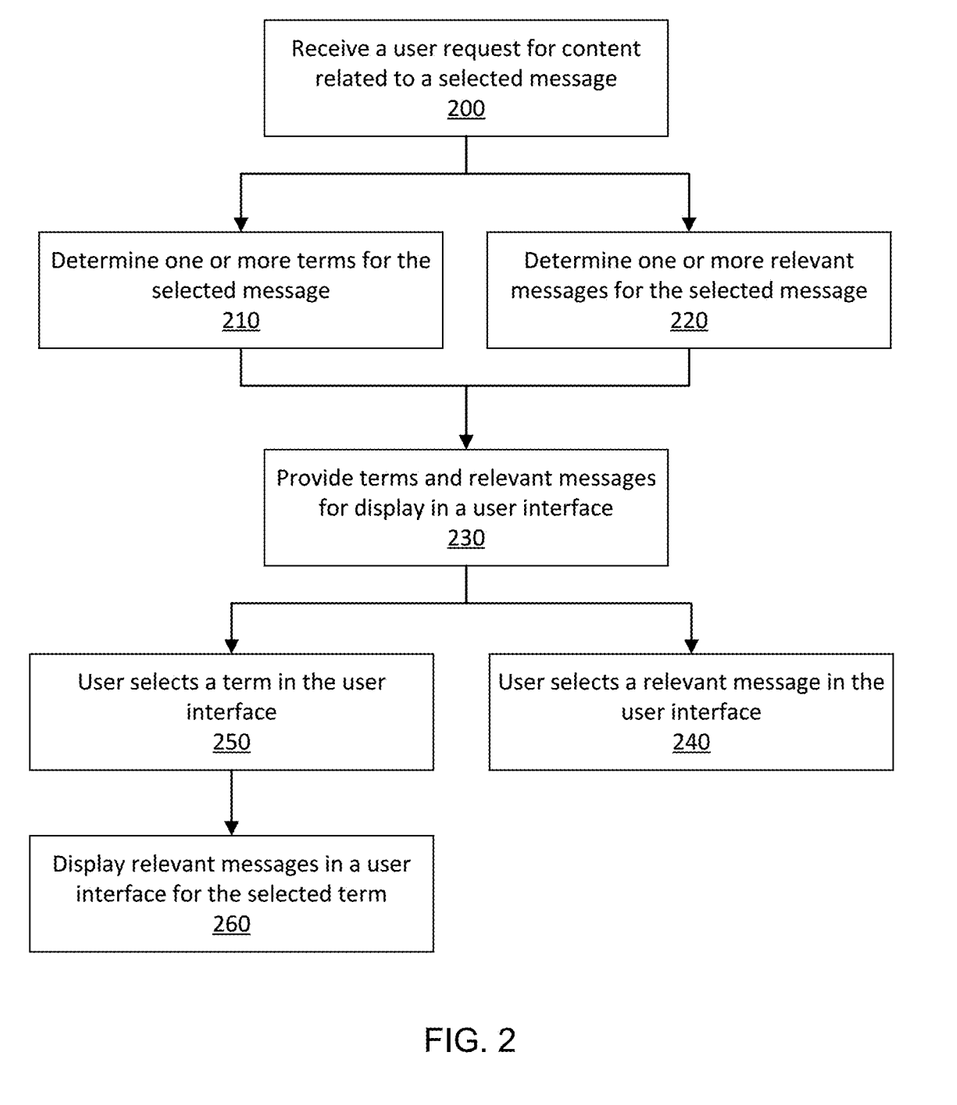
FIG. 2 is a flowchart of an example process for determining related content on a social networking platform.

FIG. 2 is a flowchart of an example process for determining related content on a social networking platform. The process will be described as being performed by the platform described in reference to FIG. 1.

The platform, through a user device, receives a request from a user of the platform for content related to a particular message (200). The related content can include (i) content related to one or more terms associated with the message or (ii) one or more messages relevant to the selected message. The one or more terms associated with the message can be used as search terms for identifying content related to particular aspects of the message, e.g., particular topics associated with the message.

The platform generates a user interface showing a stream of messages for display on a user device. The user can submit the request for related content for a particular message by selecting a user-selectable element, which will be referred to as an explore button, associated with that message for that purpose. Although it is referred to as a button, this user interface element can be implemented in any technically convenient form.

The user can use the message as a jumping off point for exploring one or more topics. For example, the user can explore related content for explanation or clarification on the selected message.

The platform, after receiving the user request for related content, selects one or more terms for the selected message (210).

The platform can obtain the terms using a predetermined mapping that maps content to terms. This mapping can be part of the content analysis module, can be part of a separate component of the platform, or can be provided by an external system. For example, the mapping can be represented by a data structure that maps words and phrases to one or more topics represented as words or phrases. This mapping can be generated through analysis, e.g., semantic analysis, of a collection of message content, e.g., from the message repository. The platform can then return the one or more topics as terms for the selected message.

In some implementations, to build an association between message content and terms, the content analysis module first identifies a set of candidate terms from the selected message, and then scores and ranks the candidate terms to identify a set of terms. In some implementations, to identify a set of candidate terms, the content analysis module takes all words or phrases in a message to be candidate terms. In other implementations, the content analysis module uses heuristics to identify a smaller initial set of candidate terms. Example heuristics include one or more of removing punctuation, removing stop words, filtering out certain parts of speech, e.g., prepositions, or filtering out phrases that match any predetermined part of speech patterns. In some implementations, the content analysis module uses an external knowledge base as reference to identify candidate terms that are likely, or not likely, to be meaningful.

In some implementations, the platform obtains one or more candidate terms by analyzing one or more signals on the social networking platform. Signals can include any suitable informative or communicative signals that provide information on users' accounts, user interactions, user relations, or messages on the platform. The platform can obtain signals both within and from outside of the platform. For example, the message repository module can store signals, for example, the timestamp or popularity, e.g. the number of times a message has been shared, of a message. The platform content analysis module can use an Application Programming Interface (API) to gather outside information from outside sources, e.g., recently published news articles. The platform can perform text mining on information retrieved from outside sources, e.g., using frequency statistics or supervised or unsupervised machine learning models, to generate structured signals from unstructured text information.

To score and rank the candidate terms, the content analysis module can use frequency statistics-based information retrieval functions to score the candidate terms. Examples of frequency statistics-based information retrieval functions include term frequency-inverse document frequency (tf-idf), BM25, or rapid automatic keyword extraction algorithm (RAKE). The content analysis module then selects terms from the top-ranked candidate terms.

In some implementations, the content analysis module employs previously-trained unsupervised machine learning models to select terms from the candidate terms. For example, the content analysis module can use a graph-based ranking method in which the importance of a node is determined by its degree of connections to other nodes, in which the entire message is represented as a graph with candidate terms as nodes and associations between candidate terms as edges. Examples of unsupervised machine learning models for selecting terms include TextRank, DivRank, and topic-based clustering.

In other implementations, the content analysis module employs supervised machine learning models to select terms from the candidate terms. Example methods supervised machine learning models include Naïve Bayes classifiers, decision trees, random forest, support vector machines, logistic regression classifiers. In addition to message content, the content analysis module can use one or more features associated with a message to extract terms, e.g., the message's structural features, metadata, or external resource-based reference.

Once the content analysis module selects terms from candidate terms, the content analysis module scores and ranks each term, if that has not already been done, and returns those with score that satisfies a specified threshold.

The platform, after receiving the user request for related content, determines one or more messages that are relevant to the selected message (220). A message may be determined to be relevant because it shares at least one signal or term with the selected message, for example, because it relates to the same topic, e.g., based on a matching term, or has the same authoring account as the selected message.

The platform computes a relevance score for each of the determined relevant messages using one or more signals. The relevance score indicates the degree of relevance between the relevant message and the selected message. The platform uses the relevance score to rank or filter relevant messages. For example, the platform can prioritize relevant messages with relatively high relevance scores and remove relevant messages with relatively low relevance scores.

The platform provides the one or more terms and the one or more relevant messages for display in a user interface (230). For example, in response to the search request, the user is presented with a user interface that includes the one or more terms and one or more relevant messages. Generally, the platform provides more terms or messages or both than can be displayed at one time, and the user can view them by scrolling in the user interface. The user can engage with a presented relevant messages, e.g., by liking, responding, or rebroadcasting the message.

The user can select one of the presented relevant messages (240). For example, the user can open the message in a new user interface that includes more details for the message. Each of the presented relevant messages includes a respective explore button similar to the one of the original message. The user can select the explore button associated with a presented relevant message to initiate a new search request based off of that message.

The user can select one of the presented terms (250). In response to the selection of a particular term, the platform performs a search of messages on the platform based on that selected term. For example, for a term representing a particular topic, the platform can search a message repository for messages relevant to that topic. The platform can rank or filter the relevant messages, e.g., using one or more signals, before presenting results to the user in a user interface.

The platform, after determining the relevant messages for a selected term, displays those messages in a user interface (260). For example, the platform can display the relevant messages in a user interface similar to that presented in step 230.

In some implementations, the platform stores user selections as training data to improve the platform's extraction of terms and identification of relevant messages. The user selection data can be used to train an machine learning model to determine terms and relevant messages for a particular selected message.

In some implementations, the platform displays information about one or more relevant accounts in response to the user's request for content related to a particular message. The platform can identify as relevant, accounts on the platform that have broadcast messages relevant to the particular message, e.g., messages that mention or engage with the particular message. In some implementations, the platform can identify as relevant, accounts on the platform that belonging to users who possess special knowledge about a topic of a particular message. As another example, the platform can identify as relevant, accounts on the platform that have caused high user engagement on the particular message.

FIGS. 3A-3E illustrate example user interfaces for displaying content on a social networking platform.

Figure 3A:
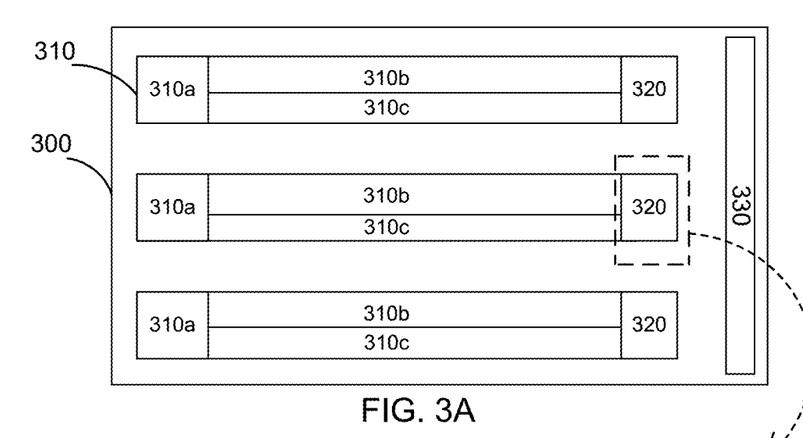
FIGS. 3A-3E illustrate example user interfaces for displaying content on a social networking platform.

FIG. 3A illustrates an example user interface of a user's home timeline 300 on a social networking platform, e.g., platform 100 described in reference to FIG. 1. The home timeline is a stream of messages. The platform may generate and transmit the home timeline to a user device when the user first logs into the social networking platform using the user device. The home timeline includes multiple, ordered content units 310. Each content unit 310 can correspond to a message of the social networking platform. In some implementations, the platform determines and orders the content units 310 based on the user's specified preferences.

In some implementations, the multiple content units 310 can be arranged on the home timeline displayed on the user device in one or more columns. For example, in FIG. 3A, the multiple content units 310 are displayed in a single column. A user interface element 330 can act as a scroll bar to change the content units 310 currently displayed on the home timeline.

Some content units 310 include an author unit 310a, a message unit 310b, and a user engagement unit 310c.

The author unit 310a displays information on the author of the respective content unit 310, e.g., an account identifier or user name or pseudonym of the message author. If the content unit 310 originates from a registered user of the platform, the author unit 310a can display the authoring user's profile picture and a link to the authoring user's profile page on the platform. If the content unit 310 originates from a source outside of the platform, e.g., was obtained using an API of an online encyclopedia, the author unit 310a can display information about the outside source, e.g., a web page title and address.

In some cases, the author unit 310a is empty. For example, the content unit 310 can be generated by an anonymous user or an unregistered user of the platform.

The message unit 310b displays an entire message or a snippet of a message. The message can be in various digital forms, e.g., text strings, emoji strings, images, GIFs, audio files, video files, or any combination of them. The message can include various metadata, e.g., user location information, timestamp information, client device information, memory size information, and so on. The message can also include various special terms, e.g., hashtags or web links.

The user engagement unit 310c displays user engagement data for the respective content unit 310. User engagement data can include various metrics on how users on the platform have interacted with the content unit 310. For example, user engagement data can include the number of "like," "share," or "retweet" engagements received by the message. As another example, user engagement data can include comments made by other users on the platform.

Each content unit 310 can include an associated user selectable explore button 320. In response to a user's selection of an explore button 320, the platform determines one or more terms and one or more relevant messages for the respective content unit 310. Optionally, the platform displays the determined terms and relevant messages on a new content page 335.

Figure 3B:
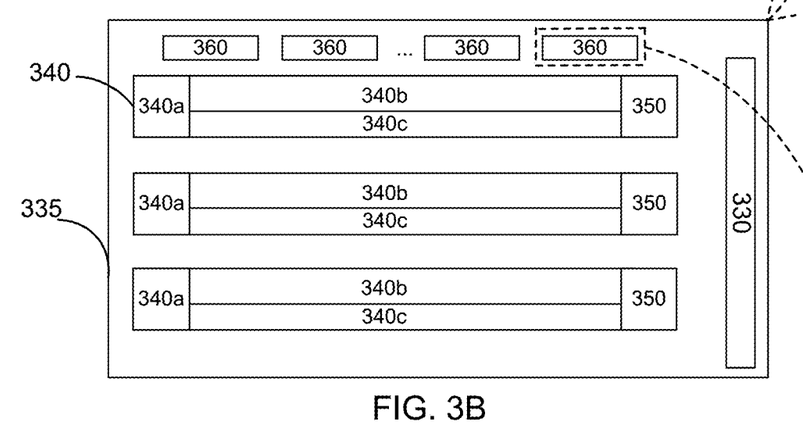

FIG. 3B illustrates an example user interface of a content page 335 generated in response to a selection of an explore button 320.

The content page 335 includes user interface elements 360 placed on top of the page that each represent one or more terms from the selected message 310. For example, as described in reference to FIG. 2, each of the user interface elements 360 can represent a search query that includes the corresponding terms. The user can select one of the user interface elements 360 to generate a new content page.

The content page 335 also includes multiple content units 340. Each content unit 340 corresponds to a message that is relevant to the selected message 310. Each content unit 340, similar to the content units 310, includes an author unit 340a, a message unit 340b, and a user engagement unit 340c.

Each content unit 340 includes an associated user selectable explore button 350. The user can select the explore button to explore one or more terms or one or more messages related or relevant to the message associated with the button.

Figure 3C:
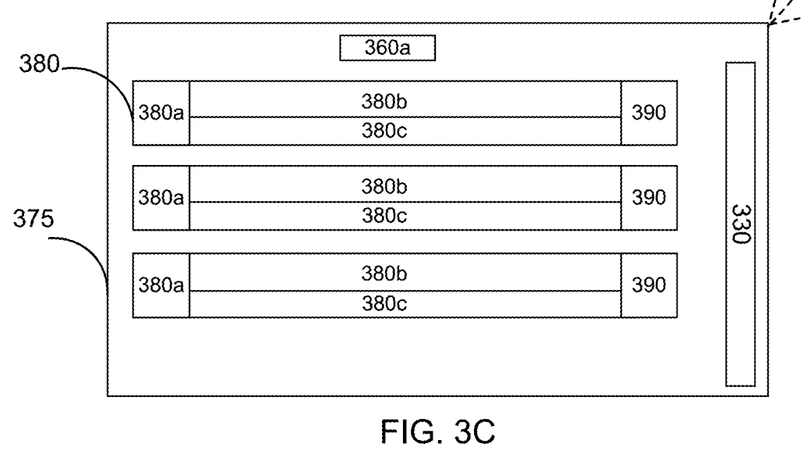

FIG. 3C illustrates an example user interface of a content page 375 generated in response to a selection of a user interface element 360 from the user interface of FIG. 3B. The content page 375 includes multiple content units 380 that each correspond to a message relevant to the terms of the selected user interface element, shown on content page 375 as element 360a. Each content unit 380 includes an author unit 380a, a message unit 380b, and a user engagement unit 380c. Each content unit 380 also has an associated user selectable explore button 390. The user can select an explore button 390 to explore relevant messages to the associated content unit 380, as described above in reference to FIG. 3B.

The platform can rank content units, e.g., content units 310, 340, or 380, on a content page based on various sorting criteria. In some implementations, content units are ordered in reverse chronological order starting with a most recent content unit. In other implementations, the content units are ordered based on a relevance score, e.g., the score described in reference to FIG. 2. In other cases, the content units are ordered based on popularity, e.g., the number of user engagements received by the messages.

In some implementations, the user can select a particular ranking method, e.g., by selecting one or more particular sorting criteria.

The platform can also order the user interface elements 360 based on a probability of being selected by a user.

The platform can provide the user interface with a navigation element that a user can use to navigate among content pages 300, 335, and 375, e.g., with a left or right scrolling or swiping motion, or provide a user interface that responds to such a motion with a navigation action.

Figure 3D:
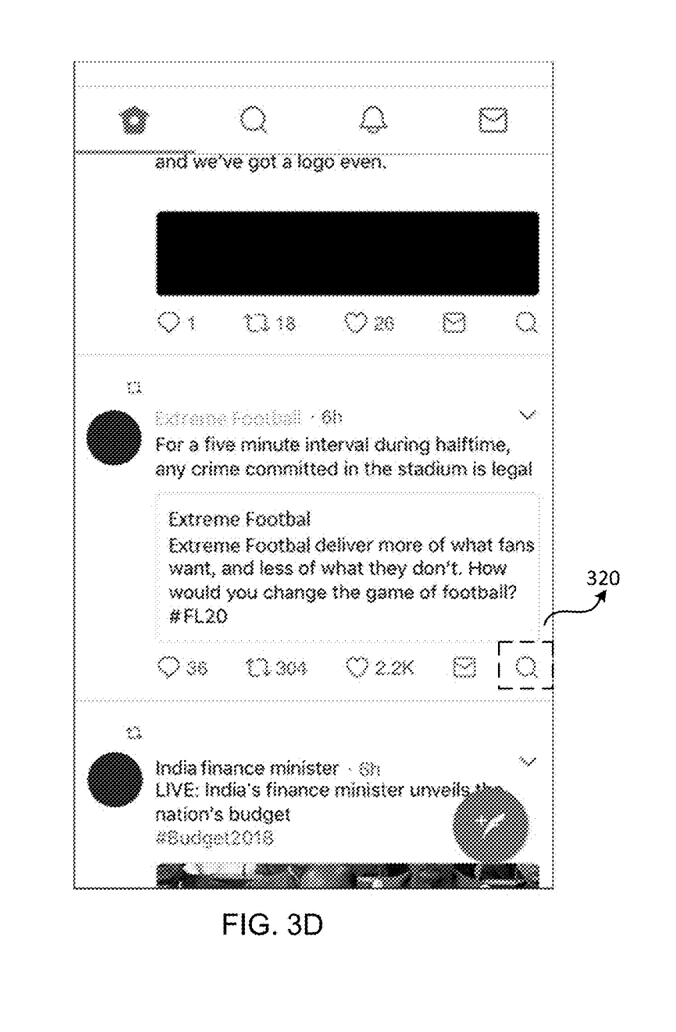

FIG. 3D is another example user interface showing different content units.

Figure 3E:
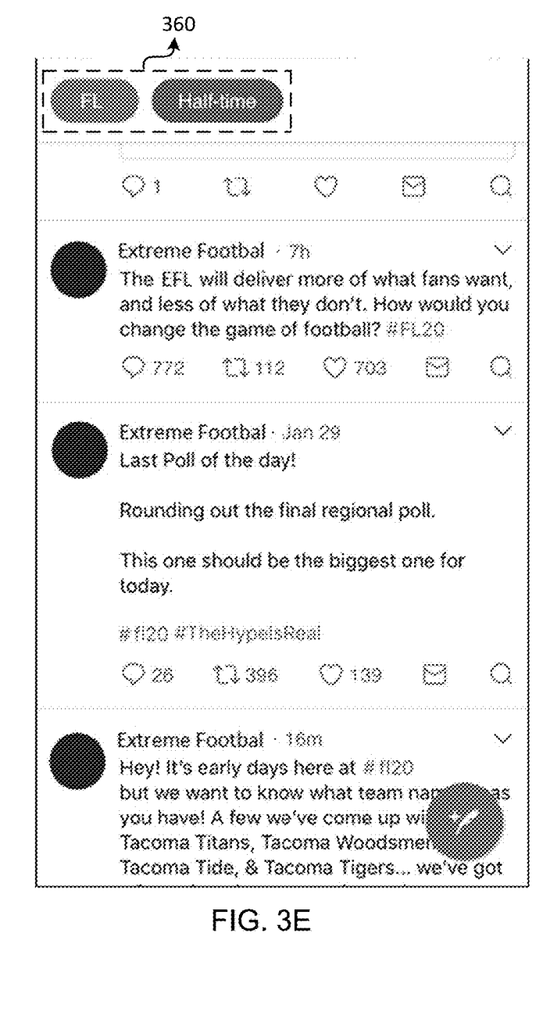

FIG. 3E is an example user interface generated in response to a user selecting an explore button 320 on the user interface in FIG. 3D. The example user interface in FIG. 3E also includes multiple terms 360 related to messages displayed.

Figure 4:
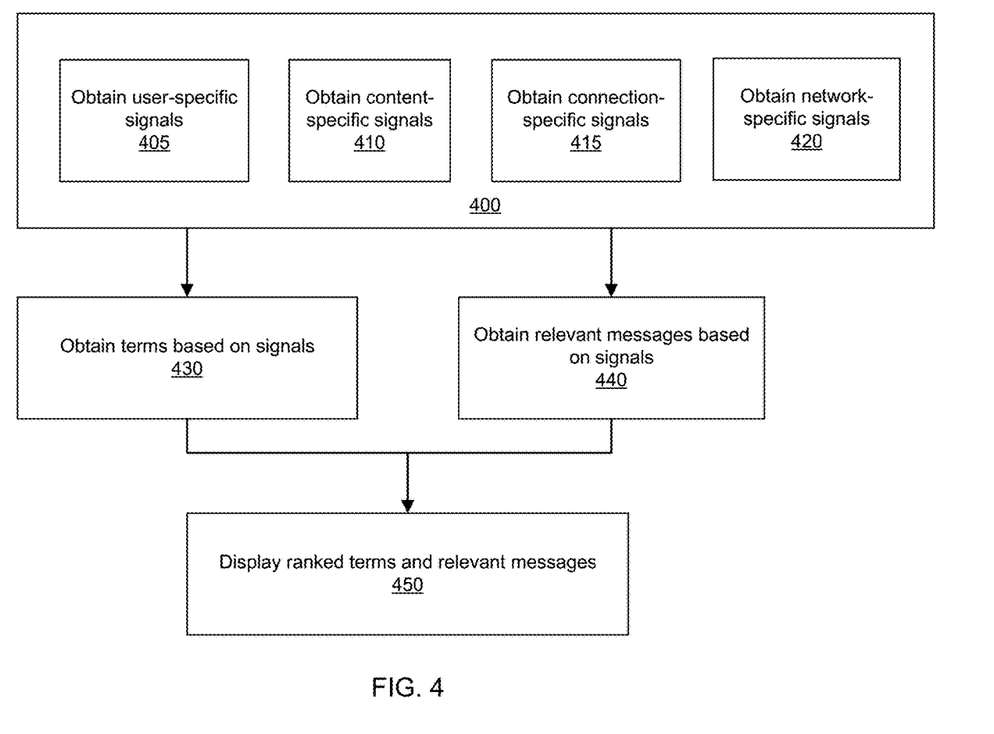
FIG. 4 is a flowchart of an example process for generating and displaying related terms and messages based on signals.

FIG. 4 is a flowchart of an example process for determining terms when no existing mapping to terms exists for the message content. The process will be described as being performed by the platform described in reference FIG. 1. In this process, the platform determines terms that are associated with a message selected by a user and provides search terms capturing different aspects of the user-selected message.

The platform, in response to the user selection of a message, obtains various relevant signals (400). The signals can be obtained from one or more sources.

In some implementations, the platform processes the user's social network profile to obtain one or more user-specific signals (405). For example, the platform can access the account repository 146 of FIG. 1 to obtain the user's location, organization, gender, or any self-identified interests. In addition or alternatively, the platform can access the message repository 140 to obtain the user's previously sent or received messages. The platform can use such information to identify terms most relevant to the user.

For example, the platform can diversify signals by extracting information from users with opposite viewpoints. The platform can identify users with different self-declared political, religious, or social views and present a mix of their messages.

The platform processes the particular message to obtain one or more content-specific signals (410). For example, the platform can employ one or more natural language processing algorithms to analyze the message's textual content. The platform can employ other algorithms to analyze non-textual content, e.g., using an artificial neural network for image or audio processing, to extract signals relevant to the message's content.

For example, processing the textual message "an earthquake struck my city when I was sleeping in my bedroom last night" will return the signal "earthquake" rather than "bedroom" since the platform can recognize that "earthquake" is a much more important signal than "bedroom."

The platform optionally also processes the user's social networking connections to obtain one or more connection-specific signals (415). For example, the platform can access a connection graph in a connection graph repository to obtain the user's social networking connections. The platform can then identify terms selected by the user's connections on the platform for the particular message. In this way the platform can identify signals most relevant to the user's community.

In another example, the platform can use the connection graph as a negative filter to identify relevant content from unconnected users on the platform. Furthermore, the platform can prioritize a signal from a connection with low engagement with the user.

The platform optionally also processes content with high user engagement on the social networking platform to obtain network-specific signals (420). Network-specific signals identify currently popular or trending content on the platform. For example, the platform can identify a trending term as an important signal based on the usage by celebrities and politicians. Although the term may not have prior context on the platform, the platform can recognize the term as an important signal based on the generated user engagement.

The platform analyzes the one or more signals to obtain one or more terms (430). For example, the platform can generate the one or more terms with a content-based filtering method, a collaborative filtering method, or a combination of both. For example, under the collaborative filtering approach, the platform can recommend terms without requiring a preexisting mapping between message content and the terms. The platform can analyze the signals to identify other users who are similarly situated on the platform as the current user, and analyze the terms or messages they have selected.

The platform can use the one or more signals to obtain one or more relevant messages (440). For example, the platform can perform a search on the platform using different combinations of signals as search terms. The platform can obtain relevant messages from accounts not connected to the user or remove duplicated relevant messages to increase content diversity.

The platform can order and display the terms and relevant messages on a user interface (450), e.g., the content page 335 described in reference to FIG. 3B. For example, the platform can order the relevant messages based on a relevance score for each message. The platform can calculate the relevance score for each message using a weighted average of signals and their respective weights. For example, the weights can be determined using an artificial neural network with the user's previous selections as training data. The platform can implement a cut-off relevance score to filter out content that is are too remotely related.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable destination apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) destination, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   providing a set of instructions to a user device, wherein the set of instructions when executed by the user device generates a first user interface displaying multiple messages of a social networking platform and a respective explore button in association with each of the multiple messages;
   receiving, from a first user of a plurality of users of the social networking platform, a first request for content related to a first user-selected message of the multiple messages, wherein the first user submits the first request by selecting the associated explore button;
   in response to receiving the first request,
      processing a social network profile of the first user to obtain multiple user-related signals, wherein each of the multiple user-related signals comprises one or more features of the first user's social network profile on the social networking platform, wherein the multiple user-related signals comprise a connection-specific signal for a second user that is connected to the first user in a connection graph of the social networking platform that represents relationships between the first user and one or more other users, wherein the connection-specific signal comprises one or more features of a social network profile for the second user, including content authored by the second user;
      processing the first user-selected message to obtain multiple message-related signals, wherein each of the multiple message-related signals comprises one or more features of the first user-selected message in the social networking platform; and obtaining, based at least on the multiple user-related and message-related signals, multiple terms and multiple relevant messages, wherein each of the multiple relevant messages comprises content on the social networking platform related to a subject of content of the first user-selected message or comprises content generated by an author of the first user-selected message, and wherein each of the multiple terms comprises one or more searchable keywords related to the first user-selected message, the multiple terms including a term that is a searchable keyword obtained from the content authored by the second user; and causing the user device to generate a second user interface, wherein the second user interface comprises:

a first section displaying multiple user interface elements each representing a respective term of the multiple terms, wherein the multiple terms (i) each comprise the one or more searchable keywords related to the first user-selected message and (ii) include the term that is the searchable keyword obtained from the content authored by the second user, and wherein each of the multiple user interface elements is operable when selected to cause a new search for messages to be performed on the social networking platform using the respective term as a search term; and a second section displaying the multiple relevant messages, wherein the second section of the second user interface is non-overlapping with the first section of the second user interface.

2. The method of claim 1, wherein displaying the multiple relevant messages comprises ordering the multiple relevant messages in the second user interface based on a degree of relevance between the respective relevant message and the first user-selected message.

3. The method of claim 2, further comprising:

receiving, from the first user, a second request for content related to a second user-selected message displayed in the second user interface, wherein the second user-selected message has an associated explore button, and wherein the first user submits the second request by selecting the associated explore button; and causing the user device to generate a third user interface displaying multiple terms and multiple relevant messages, wherein the multiple terms and multiple relevant messages are obtained in response to the second request, wherein displaying the multiple terms and multiple relevant messages comprises:

ordering the multiple relevant messages according to a respective relevance score generated by (i) obtaining user-related signals and message-related signals for the second user-selected message displayed in the second user interface, and (ii) processing the user-related signals and the message-related signals for the second user-selected message through a machine learning model trained to generate relevance scores and that is trained on training data comprising the multiple messages displayed in the first user interface and the first user-selected message.

4. The method of claim 3, wherein the third user interface responds to user actions to navigate among the first, second, and third user interfaces.

5. The method of claim 1, further comprising:

receiving, from the first user, a selection of a first term of the terms displayed in the second user interface;

in response to receiving the selection, performing a search on the social networking platform for messages, wherein the search is performed using the first term as keyword; and causing the user device to generate a fourth user interface displaying multiple messages returned in response to the search using the first term as a keyword.

6. The method of claim 5, wherein messages displayed in the fourth user interface are a subset of messages displayed in the second user interface.

7. The method of claim 5, further comprising:

storing the user-related signals, the message-related signals, and the user-selected terms as training data for training a machine learning model to generate terms based on the first user-selected message.

8. A system comprising one or more computers and one or more storage devices storing instructions that when executed by the one or more computers cause the one or more computers to perform operations comprising:

providing a set of instructions to a user device, wherein the set of instructions when executed by the user device generates a first user interface displaying multiple messages of a social networking platform, and wherein each of the multiple messages of the social networking platform has an associated user-selectable user interface element;

receiving, from a first user of a plurality of users of the social networking platform, a first request for content related to a first user-selected message of the multiple messages, wherein the first request is submitted by selecting the associated user-selectable user interface element;

in response to receiving the first request, processing a social network profile of the first user to obtain multiple user-related signals, wherein each of the multiple user-related signals comprises one or more features of the first user's social network profile on the social networking platform, wherein the multiple user-related signals comprise a connection specific signal for a second user that is connected to the first user in a connection graph of the social networking platform that represents relationships between the first user and one or more other users, wherein the connection specific signal comprises one or more features of a social network profile for the second user, including content authored by the second user;

processing the first user-selected message to obtain multiple message-related signals, wherein each of the multiple message-related signals comprises one or more features of the first user-selected message in the social networking platform; and obtaining, based at least on the multiple user-related and message-related signals, multiple terms and multiple relevant messages, wherein each of the multiple relevant messages comprises content on the social networking platform related to a subject of content of the first user-selected message or comprises content generated by an author of the first user-selected message, and wherein each of the multiple terms comprises one or more searchable keywords related to the first user-selected message, the multiple terms including a term that is a searchable keyword obtained from the content authored by the second user; and causing the user device to generate a second user interface, wherein the second user interface comprises:
- a first section displaying multiple user interface elements each representing a respective term of the multiple terms, wherein the multiple terms (i) each comprise the one or more searchable keywords related to the first user-selected message and (ii) include the term that is the searchable keyword obtained from the content authored by the second user, and wherein each of the multiple user interface elements is operable when selected to cause a new search for messages to be performed on the social networking platform using the respective term as a search term; and
- a second section displaying the multiple relevant messages, wherein the second section of the second user interface is non-overlapping with the first section of the second user interface.

9. The system of claim 8, wherein displaying the multiple relevant messages comprises ordering the multiple relevant messages in the second user interface based on a degree of relevance between the respective relevant message and the first user-selected message.

10. The system of claim 8, the operations further comprising:

receiving, from the first user, a second request for content related to a second user-selected message displayed in the second user interface, wherein the second user-selected message has an associated user-selectable user interface element, and wherein the second request is submitted by selecting the associated user-selectable user interface element; and causing the user device to generate a third user interface displaying multiple terms and multiple relevant messages, wherein the multiple terms and multiple relevant messages are obtained in response to the second request, wherein displaying the multiple terms and multiple relevant messages comprises:

ordering the multiple relevant messages according to a respective relevance score generated by (i) obtaining user-related signals and message-related signals for the second user-selected message displayed in the second user interface, and (ii) processing the user-related signals and the message-related signals for the second user-selected message through a machine learning model trained to generate relevance scores and that is trained on training data comprising the multiple messages displayed in the first user interface and the first user-selected message.

11. The system of claim 10, wherein the third user interface responds to user actions to navigate among the first, second, and third user interface.

12. The system of claim 8, the operations further comprising:

receiving, from the first user, a selection of a first term of the terms displayed in the second user interface;

in response to receiving the selection, performing a search on the social networking platform for relevant messages, wherein the search is performed using the first term as a keyword; and causing the user device to generate a fourth user interface displaying relevant messages returned in response to the search using the first term as a keyword.

13. The system of claim 12, wherein relevant messages displayed in the fourth user interface are a subset of relevant messages displayed in the second user interface.

14. The system of claim 12, the operations further comprising:

storing the user-related signals, the message-related signals, and the user-selected terms as training data for an artificial neural network, wherein the artificial neural network is trained to generate terms based on the first user-selected message.

15. A non-transitory computer storage medium encoded with a computer program, the computer program storing instructions that when executed by one or more computers cause the one or more computers to perform operations comprising:

providing a set of instructions to a user device, wherein the set of instructions when executed by the user device generates a first user interface displaying multiple messages of a social networking platform, and wherein each of the multiple messages of the social networking platform has an associated user-selectable user interface element;

receiving, from a first user of a plurality of users of the social networking platform, a first request for content related to a first user-selected message of the multiple messages, wherein the first request is submitted by selecting the associated user-selectable user interface element;

in response to receiving the first request, processing a social network profile of the first user to obtain multiple user-related signals, wherein each of the multiple user-related signals comprises one or more features of the first user's social network profile on the social networking platform, wherein the multiple user-related signals comprise a connection specific signal for a second user that is connected to the first user in a connection graph of the social networking platform that represents relationships between the first user and one or more other users, wherein the connection specific signal comprises one or more features of a social network profile for the second user, including content authored by the second user;

processing the first user-selected message to obtain multiple message-related signals, wherein each of the multiple message-related signals comprises one or more features of the first user-selected message in the social networking platform; and obtaining, based at least on the multiple user-related and message-related signals, multiple terms and multiple relevant messages, wherein each of the multiple relevant messages comprises content on the social networking platform related to a subject of content of the first user-selected message or comprises content generated by an author of the first user-selected message, and wherein each of the multiple terms comprises one or more searchable keywords related to the first user-selected message, the multiple terms including a term that is a searchable keyword obtained from the content authored by the second user; and causing the user device to generate a second user interface, wherein the second user interface comprises:
- a first section displaying multiple user interface elements each representing a respective term of the multiple terms, wherein the multiple terms (i) each comprise the one or more searchable keywords related to the first user-selected message and (ii) include the term that is the searchable keyword obtained from the content authored by the second user, and wherein each of the multiple user interface elements is operable when selected to cause a new search for messages to be performed on the social networking platform using the respective term as a search term and a second section displaying the multiple relevant messages, wherein the second section of the second user interface is non-overlapping with the first section of the second user interface.

16. The non-transitory computer storage medium of claim 15, wherein displaying the multiple relevant messages comprises ordering the multiple relevant messages in the second user interface based on a degree of relevance between the respective relevant message and the first user-selected message.

17. The non-transitory computer storage medium of claim 15, the operations further comprising:

receiving, from the first user, a second request for content related to a second user-selected message displayed in the second user interface, wherein the second user-selected message has an associated user-selectable user interface element, and wherein the second request is submitted by selecting the associated user-selectable user interface element; and causing the user device to generate a third user interface displaying multiple terms and multiple relevant messages, wherein the multiple terms and multiple relevant messages are obtained in response to the second request, wherein displaying the multiple terms and multiple relevant messages comprises:

ordering the multiple relevant messages according to a respective relevance score generated by (i) obtaining user-related signals and message-related signals for the second user-selected message displayed in the second user interface, and (ii) processing the user-related signals and the message-related signals for the second user-selected message through a machine learning model trained to generate relevance scores and that is trained on training data comprising the multiple messages displayed in the first user interface and the first user-selected message.

18. The non-transitory computer storage medium of claim 17, wherein the first user can navigate among the first, second, and third user interface.

19. The non-transitory computer storage medium of claim 15, the operations further comprising:

receiving, from the first user, a selection of a first of the terms displayed in the second user interface;

in response to receiving the selection, performing a search on the social networking platform for relevant messages, wherein the search is performed using the first term as a keyword; and causing the user device to generate a fourth user interface displaying multiple relevant messages returned in response to the search using the first term as a keyword.

20. The method of claim 1, wherein obtaining multiple terms and multiple relevant messages comprises:

ranking each user connected to the first user by a respective measure of engagement with the first user, wherein a third user is ranked lowest of the ranked users connected to the first user; and obtaining a term from content authored by the third user and including the term in the multiple terms.

21. The system of claim 8, wherein obtaining multiple terms and multiple relevant messages comprises:

ranking each user connected to the first user by a respective measure of engagement with the first user, wherein a third user is ranked lowest of the ranked users; and obtaining a term from content authored by the third user and including the term in the multiple terms.

22. The non-transitory computer storage medium of claim 15, wherein obtaining multiple terms and multiple relevant messages comprises:

ranking each user connected to the first user by a respective measure of engagement with the first user, wherein a third user is ranked lowest of the ranked users; and obtaining a term from content authored by the third user and including the term in the multiple terms.

23. The method of claim 1, wherein obtaining the multiple terms and multiple relevant messages further comprises:

obtaining one or more network-specific signals that identify content on the social networking platform meeting a threshold of engagement with at least two or more of the plurality of users, and obtaining one or more relevant messages from the identified content of the one or more network-specific signals.

24. The system of claim 8, wherein obtaining the multiple terms and multiple relevant messages further comprises:

obtaining one or more network-specific signals that identify content on the social networking platform meeting a threshold of engagement with at least two or more of the plurality of users, and obtaining one or more relevant messages from the identified content of the one or more network-specific signals.

25. The non-transitory computer storage medium of claim 15, wherein obtaining the multiple terms and multiple relevant messages further comprises:

obtaining one or more network-specific signals that identify content on the social networking platform meeting a threshold of engagement with at least two or more of the plurality of users, and obtaining one or more relevant messages from the identified content of the one or more network-specific signals.

26. The method of claim 1, further comprising generating, for the first user, the connection graph specific to the first user that represents relationships between the first user and one or more other users.

27. The system of claim 12, wherein messages displayed in the fourth user interface are a subset of messages displayed in the second user interface.

28. The non-transitory computer storage medium of claim 19, wherein messages displayed in the fourth user interface are a subset of messages displayed in the second user interface.

29. The non-transitory computer storage medium of claim 19, wherein the operations further comprise storing the user-related signals, the message-related signals, and the user-selected terms as training data for training a machine learning model to generate terms based on the first user-selected message.

30. The method of claim 1, wherein causing the user device to generate the second user interface comprises maintaining the first user interface as a user interface that the first user can navigate to on the user device.

31. The system of claim 8, wherein causing the user device to generate the second user interface comprises maintaining the first user interface as a user interface that the first user can navigate to on the user device.

32. The non-transitory computer storage medium of claim 15, wherein causing the user device to generate the second user interface comprises maintaining the first user interface as a user interface that the first user can navigate to on the user device.

33. The method of claim 1, wherein each of the multiple user interface elements is operable when selected to cause a new search for messages to be performed on the social networking platform using the respective term as the sole search term.

\* \* \* \* \*